March 9, 1926.  1,576,395
H. P. WOOD ET AL
ATTACHMENT FOR AUTOMOBILES
Filed July 28, 1922  2 Sheets-Sheet 2
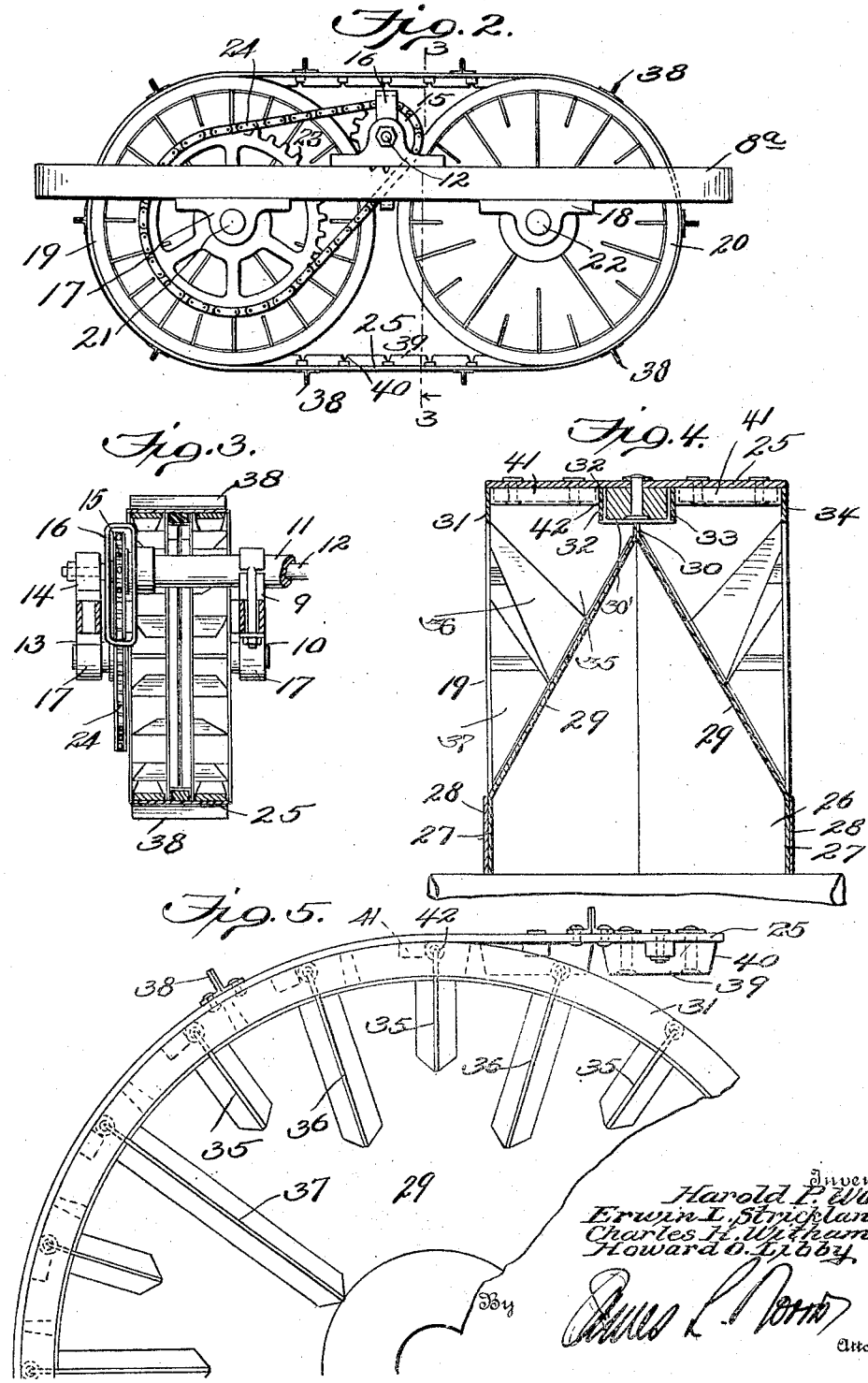

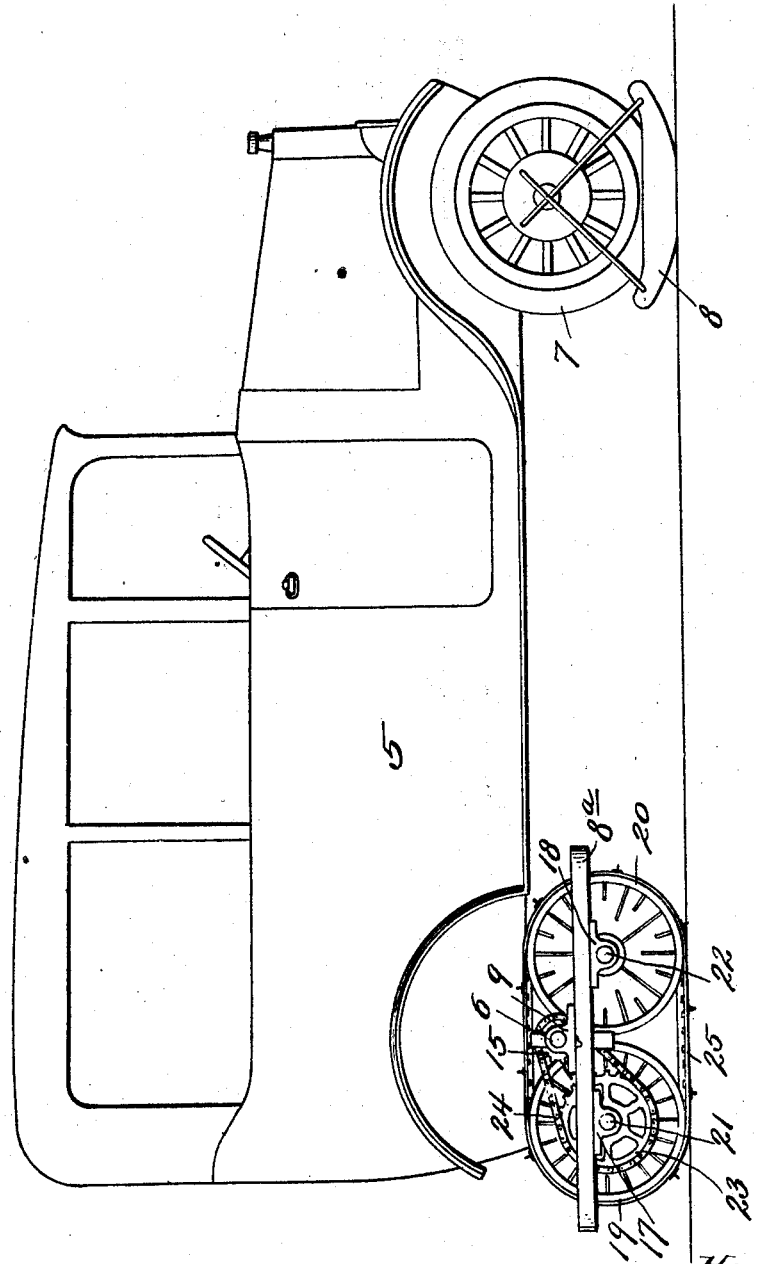

Patented Mar. 9, 1926.

1,576,395

UNITED STATES PATENT OFFICE.

HAROLD P. WOOD, ERWIN L. STRICKLAND, CHARLES H. WITHAM, AND HOWARD O. LIBBY, OF KINGFIELD, MAINE.

ATTACHMENT FOR AUTOMOBILES.

Application filed July 28, 1922. Serial No. 578,141.

*To all whom it may concern:*

Be it known that we, HAROLD P. WOOD, ERWIN L. STRICKLAND, CHARLES H. WITHAM, and HOWARD O. LIBBY, citizens of the United States, residing at Kingfield, in the county of Franklin and State of Maine, have invented new and useful Improvements in Attachments for Automobiles, of which the following is a specification.

This invention relates to an attachment for automobiles and particularly to what may be properly termed a winter attachment adapting the automobile for positive travel over snow and ice.

The primary object of the invention is to provide a self-contained tractor structure which is intended to replace the ordinary rear drive wheel and capable of easy application to and removal from the rear drive axle of the usual sectional type, the improved attachment being of such general dimensions and proportions as to readily operate under the usual rear wheel guards and having a vertical extent corresponding to the diameter of the drive wheels which the attachment replaces when applied.

A further object of the invention is to provide a tractor attachment of the class specified having drums engaged by the tractor belt of such specific construction as to obstruct accumulation of snow and ice thereon and also operating to liberate and cast off laterally any accumulations that may be brought around and over the drums by the tractor belt.

A still further object of the invention is to provide a tractor attachment having a novel form of tractor belt and a corresponding structural provision embodied in the drums over which the belt has movement, to prevent lateral shifting of the belt and to always insure a direct central engagement of the belt relatively to the drums.

With these and other objects and advantages in view, the invention consists in the construction and arrangement of the several parts which will be more fully hereinafter described and claimed.

In the drawings:

Fig. 1 is a side elevation of an automobile of the sedan type, showing the improved attachment applied thereto;

Fig. 2 is a side elevation of one of the attachments on an enlarged scale;

Fig. 3 is a transverse vertical section on the line 3—3 of Fig. 2;

Fig. 4 is a transverse vertical section of a portion of one of the drums on an enlarged scale;

Fig. 5 is a side elevation of a portion of one of the drums and a part of the belt also shown on an enlarged scale.

The numeral 5 designates an automobile or motor vehicle of well known form having a rear axle 6 comprising as usual independently operating sections adapted to be controlled as to their operations by a differential, not shown. To render the improved attachment effective for winter service, the front or steering wheels 7 have runners 8 applied thereto and suitably supported from the center of the wheel. These runners 8 may be of any suitable form best adapted to serve their purpose and provide for practical steering operations without the least interference. These runners 8 are intended to be removably applied to the front wheel 7 and are well known in the prior art. The runners 8 are incidental attachments that render the automobile more effective for winter service in traveling over snow and ice, but in some cases the said runners may be omitted.

The essential feature of the invention consists of the tractor attachment or self-contained unit shown complete by Figs. 1 and 2 and embodying a rectangular enclosing frame $8^a$ having an upper central bearing organization 9 for application over the end of the axle 6 after the drive wheel has been removed. As shown by Fig. 3, the bearing 9 is located on the inner longitudinal side member 10 of the frame $8^a$ and receives the enclosing casing 11 of the sectional axle 12, said axle 12 projecting outwardly beyond the casing and terminating over the outer side member 13 of the frame where it engages a bearing 14 also disposed at the center of the frame $8^a$. On the outer end of the axle 12 a sprocket pinion 15 is keyed and located just inside of the bearing 14, and over this sprocket pinion a chain belt guard 16 is disposed and is of rectangular form. This chain guard depends below the frame and operates in a manner which will be presently explained. Depending from the side members 10 and 13 of the frame $8^a$ equally in advance and in rear of the vertical center of the said frame are bearings 17 and 18, each side member of the frame having one of these bearings attached thereto and the pair of bearings transversely alined as shown by Fig. 3. Within the frame 8ª are drums 19 and 20, respectively having trunnions 21 and 22 engaging the bearings 17 and 18, the trunnion 21 of the rear drum 19 also having thereon a sprocket wheel 23 of materially greater diameter than the sprocket pinion 15, and trained over the said sprocket wheel 23 and pinion 15 is an endless chain belt 24, by means of which the rear drum is driven to actuate a traction belt 25 engaging and traveling around both drums 19 and 20. The guard 16 by reason of the particular arrangement thereof, as hereinbefore specified, operates to maintain the endless chain belt 24 in engagement with the sprocket pinion 15, and also by its dependence holds the said sprocket chain in engagement with the sprocket wheel 23, so as to avoid the inconvenience that might otherwise ensue if the chain belt 24 was permitted to run without restriction and thus have a tendency to jump or be disengaged from either the sprocket pinion 15 or sprocket wheel 23.

The drums 19 and 20 are similar in construction and have been particularly devised to have an anti-clogging function, and, as clearly shown by Fig. 4, the main body 26 at the center has parallel outer and inner sides 27 extending a comparatively short distance radially of the trunnion, and on the outer faces of the sides 27 are outer annular reinforce plates 28, to provide sufficient stiffness or rigidity at the center of the said body 26. From the comparatively narrow parallel front and rear members 27 the body 26 has converging sides 29 which are joined at their outer edges in the form of a radially extending straight central flange 30. The body of each drum is preferably formed of sheet metal of suitable thickness, and, by shaping the sides as specified, the greater portion of each drum is given a conical contour, that is to say, the body, from a point near its periphery is provided with sides which equally slope outwardly toward the axis of the drum, which sloping sides, together with the vanes or blades to be described later on, serve as deflectors or castoff portions. At the outer and inner sides of each drum are annular outer rim plates 31, 32, 33 and 34, the plates 32 and 33 being at the center of the drum and the plates 31 and 34 respectively at the outer and inner sides thereof. These plates are secured to and sustained in position by vanes or blades 35, 36 and 37 of varying length, which extend radially of the drum from the periphery of the latter toward the center of the drum, all of the radial blades 35 being comparatively short. Some of the spaces between successive blades 35 are intersected by the longer radial blades or vanes 36 and some of said spaces are intersected by the blades 37, which latter extend fully from the rim plates to the reinforce plates or disks 28. Each of the radial blades 35, 36 and 37 has one of its edges connected to one of the converging side members 29, but the blades 35 and 36 extend only part way from the rim plates 31, 32, 33 and 34 to the center of the drum and the edges of the blades 35 which are secured to the converging side members 29 are shorter than the corresponding edges of the blades 36. Therefore, the edges of the blades 35 which extend from the side members 29 to the rim plates 31 and 34 are shorter than the corresponding edges of the blades 36, so that the blades 35 and 36 serve as accumulation expelling means. The shorter blades 35 are very effective in clearing the spaces betwen the other vanes or blades and particularly at the outermost converged portions of the outer converging sides 29 of the body 26, as shown by Figs. 2, 4 and 5. The blades all act as accumulation expelling means when the drums are rotating despite the fact that the said blades are fixed portions of the drums. All of the vanes or blades 35, 36 and 37 also divide the outer opposite side portions of each drum into spaces of reduced area, the several spaces having dimensions depending upon the radial extent of the said vanes or blades. and moreover, the vanes or blades serve as beaters varying in different radial extent over the opposite inclined side portions 29 of the body 26, which will result in the throw-off of snow or other matter that might otherwise tend to accumulate in the spaces between the blades and adhere to the opposite outer converged portions of the drums. The inner pair of annular rim plates 32 and 33 are in spaced relation, as shown by Fig. 4, and between the inner edges of these plates 32 and 33 there is an open space 30′ which is intersected at intervals by the vanes or blades 35, 36 and 37, the said vanes or blades extending fully to the central flanged terminals 30 of the converging side members 29. By this means any snow, ice or other material that may fall between the inner annular plates 32 and 33 passes out through the spaces or passageways defined by the radial vanes or blades 35, 36 and 37 and is cast off at either one side or the other of the drum.

The endless traction belt 25 consists of a band of suitable material wide enough to extend fully from the outer side of the ring 31 and the inner side of the ring 34 of the rim plate 31 to the outer side of the rim plate 34. At intervals on the outer surface of the belt 25 are angularly projecting tractive flanges 38 which extend fully across the belt 25 and are firmly secured to the latter. On the inner side at the center of the belt 25 at its longitudinal center are a plurality of blocks or anti-shifting members 39 which are preferably inclined at their ends 40 to allow the said blocks to conform to the curved disposition of the belt in passing around the peripheries of the drums 19 and 20. These blocks or anti-shifting members 39 are firmly riveted or otherwise secured to the belt 25 and are of such dimensions as to readily move between the plates 32 and 33 and serve to prevent the belt 25 from shifting laterally in either direction, the plates 32 and 33 under these conditions serving as guards against which the opposite sides of the several blocks 39 may contact in the event there is any tendency towards lateral movement or drag of the belt. On the inner side of the belt and extending from points adjacent the edges thereof to points near the opposite plates 32 and 33 are operating lags or ribs 41 which are also securely riveted or otherwise secured to the belt and are of such dimensions and so spaced apart as to freely travel or move between the rim plates 31 and 32 and 34 and 33. The outer end edges of the several radial vanes or blades 35, 36, and 37 have cylindrical heads 42 secured thereto, which heads extend fully across the spaces between the plates 31 and 32 and 33 and 34. These heads 42 serve as contacting means for engagement with the side edges of the lags or ribs 41, and by means of same the belt 25 is given a regular traveling movement when one drum 19 is rotated through the sprocket wheel 23, chain belt 24, and sprocket pinion 15. It is obvious that the belt 25 will travel in a direction corresponding to the direction of rotation of the shaft 12. Through the belt 25 the drum 20 is actuated, the lags or ribs 41 engaging the heads 42 of said drum 20 and rotating the latter drum at a speed equal to that of the drum 19. Any material, such as snow or ice, that is carried up over the drums 19 and 20 by the belt and by the blocks or members 39 will be free to drop through the open spaces between the vanes or blades 35, 36 and 37, and it is obvious that such material will be loosened or shaken from the belt and the blocks 39 by the vibration of the mechanism. As a consequence the belt and the operating members in connection therewith will, as hereinbefore explained, be kept reasonably free of any accumulated material that may be taken up during the travel of a portion of the belt directly over or close to the snow or ice surface.

From the foregoing the operation of the improved attachment will be readily understood and the advantages thereof in maintaining a reasonably cleanly condition by preventing accumulation of snow or ice on the parts thereof will result in the freer operation of the moving parts. The components of the improved attachment are also comparatively simple and few in number and the drums 19 and 20 are strong and durable yet light in structure, owing to the preferred sheet metal formation thereof and the bracing effect particularly adjacent to the periphery of each drum as provided by the vanes or blades 35, 36 and 37.

The improved attachment in conjunction with the runners 8 on the steering wheels 7 cooperates to render an automobile or motor vehicle effectively operative over snow and ice. It will be understood, however, that the improved tractor attachment embodying the features of the invention may be used on a vehicle without the runners 8 on the front or steering wheels in traveling over ordinary roadways or for facilitating climbing over steep ascents or under any other conditions where it may be found that the improved attachment will be advantageous.

What is claimed as new is:

1. An attachment of the class specified, comprising a pair of drums, each embodying a pair of spaced annular plates adjacent its hub, a pair of side members each extending radially from one of said annular plates toward the periphery of the drum and converging with the other side member adjacent said periphery, a plurality of blades projecting laterally from each of said side members, a pair of outer annular rim plates, an additional pair of annular rim plates intermediate said outer rim plates and spaced from the latter and from one another, said outer and intermediate rim plates being connected to and supported by the ends of said blades and said intermediate rim plates being located on opposite sides of the plane of convergence of said side members, and a belt trained around the peripheries of said rim plates and having means extending between said outer and intermediate rim plates and engageable with the ends of said blades for driving one of said drums from the other.

2. In an attachment of the class specified, the combination of rotatably mounted drums each having a body with side portions converging toward the periphery of the drum, a plurality of blades extending radially of the drum from the periphery of the latter over the side portions and spaced apart, the ends of the blades being provided with contact heads and each drum having at its periphery an open space extending fully around the latter between the said contact heads, an endless traction belt trained over the drums and having central block members extending into said open space to prevent lateral shifting of the belt and also having transversely extending ribs to engage the said heads for driving one drum from the other, 3. An attachment of the class specified having a drum with a body provided with side members converging toward the periphery of the drum and also having opposite side and intermediate annular rim plates adjacent its periphery, the intermediate plates being separated and forming an open space through the periphery of the drum, and a plurality of blades extending radially of the drum over the converging side members varying distances and having their outer ends provided with contact heads for engagement by operating means.

In testimony whereof we have hereunto set our hands.

HAROLD P. WOOD.
ERWIN L. STRICKLAND.
CHARLES H. WITHAM.
HOWARD O. LIBBY.